United States Patent [19]

Makoto

[11] Patent Number: 5,464,273
[45] Date of Patent: Nov. 7, 1995

[54] SEAT CONSTRUCTION

[75] Inventor: Sera Makoto, 2760-21, Izumicho, Izumi-ku, Yokohama, Kanagawa Pref., Japan

[73] Assignee: Kotobuki Seating Co. Ltd., Tokyo, Japan

[21] Appl. No.: 346,844

[22] Filed: Nov. 30, 1994

Related U.S. Application Data

[63] Continuation of Ser. No. 47,701, Apr. 14, 1993, abandoned, which is a continuation-in-part of Ser. No. 729,947, Jul. 15, 1991, abandoned.

[51] Int. Cl.⁶ .................................................. A47C 15/00
[52] U.S. Cl. .................... 297/232; 297/450; 297/452.18; 297/452.38; 297/452.4; 297/452.55
[58] Field of Search ............................ 297/232, 452.18, 297/452.19, 452.20, 452.11, 452.38, 452.39, 452.4, 452.55, 452.59

[56] References Cited

U.S. PATENT DOCUMENTS

| | | | |
|---|---|---|---|
| 2,720,914 | 10/1955 | Doty et al. | 297/450 X |
| 3,625,565 | 12/1971 | Barecki | 297/232 X |
| 3,630,566 | 12/1971 | Barecki | 297/450 X |
| 3,797,887 | 3/1974 | Barecki et al. | 297/445 X |
| 3,802,738 | 4/1974 | Tantlinzer | 297/445 X |
| 3,873,155 | 3/1975 | Barecki . | |
| 3,897,974 | 8/1975 | Barecki | 297/232 X |
| 4,036,527 | 7/1977 | Faul . | |
| 4,120,533 | 10/1978 | Harder, Jr. | 297/232 X |
| 4,365,840 | 12/1982 | Kehl et al. | 297/232 X |

FOREIGN PATENT DOCUMENTS 722006 11/1965 Canada ............................ 297/452.18

*Primary Examiner*—Laurie K. Cranmer
*Attorney, Agent, or Firm*—Lockwood, Alex, FitzGibbon & Cummings

[57] ABSTRACT

A seat construction including a composite inner/outer frame to which at least two seat pans are secured. The composite frame includes three horizontal cross members, located at the front ends of bottom portions of the seat pans, at the junctions of the bottom portions and back portions of the seat pans, and at the top ends of the back portions of the seat pans. A pair of boomerang-shaped side members are fixed at their distal ends and their bent centers to the opposing ends of the cross members and an intermediate member is fixed to the mid-ways of the cross members, so that an inner frame is formed by the side members, cross members, and intermediate member. The side members the front cross member and the intermediate frame member are covered by their corresponding outer frame members to construct the composite inner/outer frame which is light in weight but rigid in construction.

16 Claims, 2 Drawing Sheets

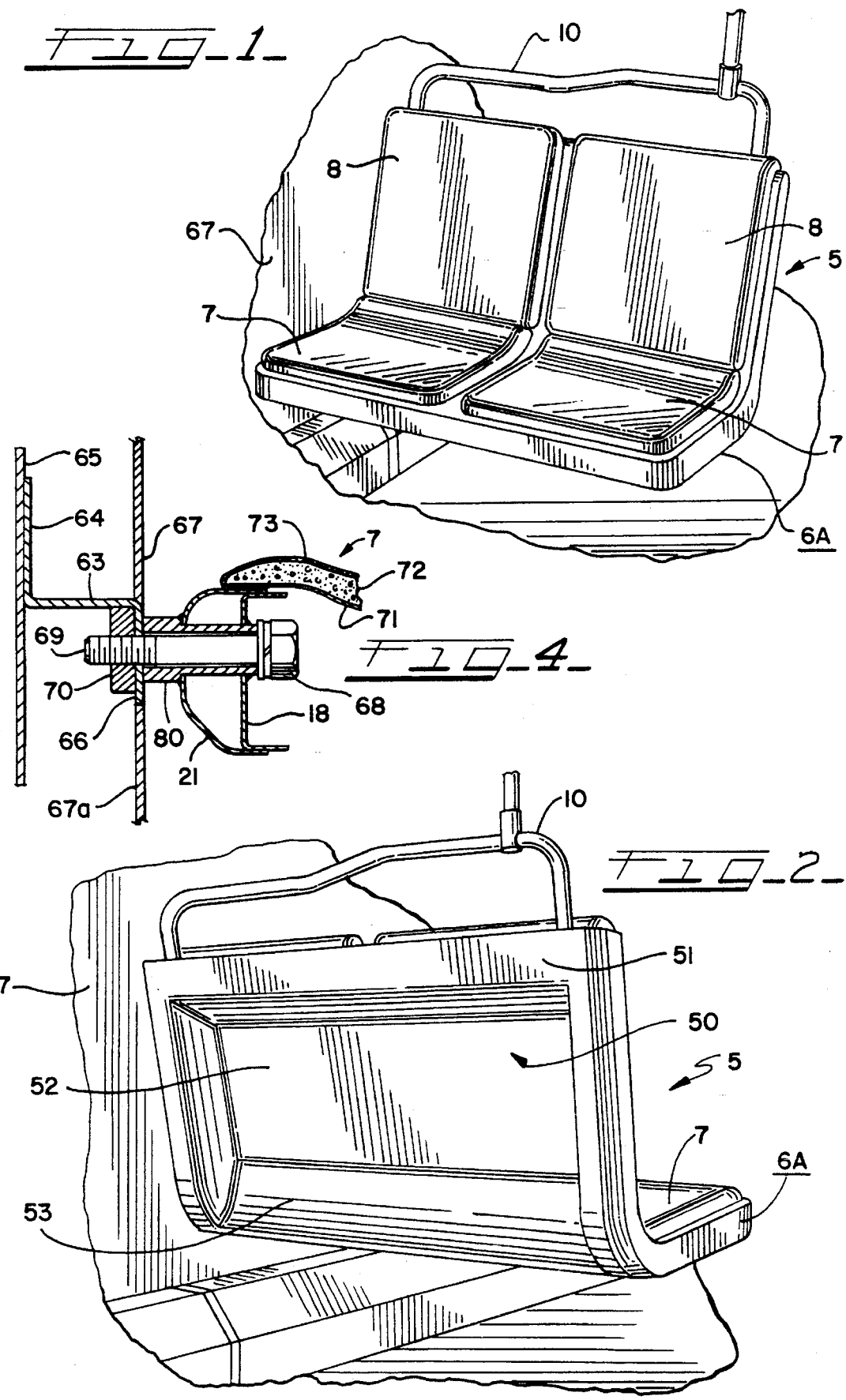

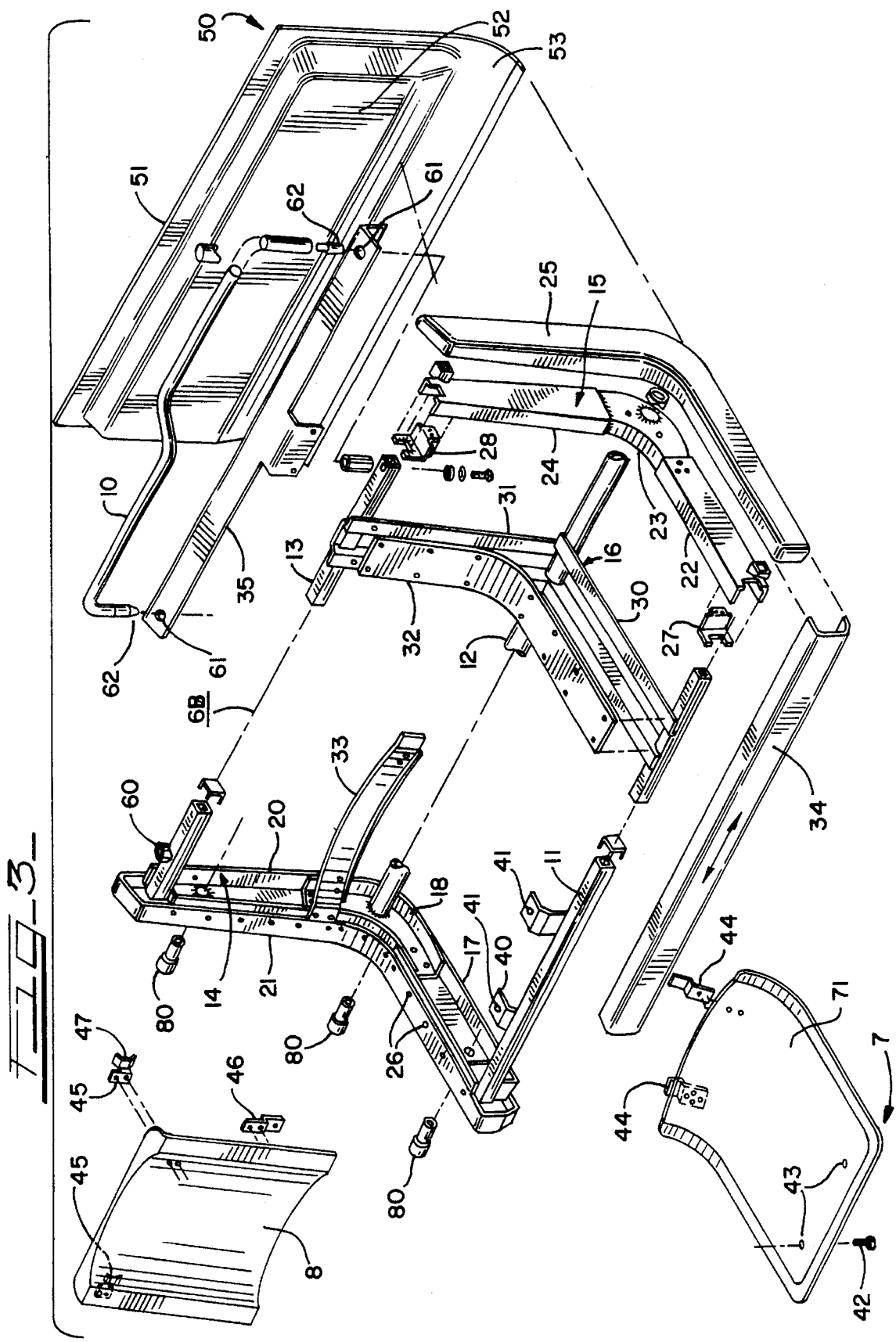

SEAT CONSTRUCTION

This application is a continuation, of application Ser. No. 08/047,701, filed Apr. 14, 1993, which is a continuation-in-part of application Ser. No. 07/729,947, filed Jul. 15, 1991, now abandoned.

BACKGROUND AND DESCRIPTION OF THE INVENTION

This is a Continuation-In-Part of U.S. patent application 07/729,947, filed on Jul. 15, 1991.

This invention relates to new improvements in seat constructions which are used for mass transport vehicles such as busses, subway cars and other rail passenger cars and for public facilities and public houses such as railway stations and in public open space.

Seat constructions for mass transport vehicles are known in U.S. Pat. No, 3,873,155, No. 4,036,527, No. 3,797,887, and No. 2,720,914. In these patents, since the outer frame of the seat construction is integrally formed of one member, it is difficult to change the width of the seat construction which becomes necessary when changing the number of seats, changing the width of each seat or changing the installation method of the seat construction in a mass transport vehicle. Conventional seat construction such as the above require changes in the manufacturing line when various changes are performed as described above. Further, in conventional seat constructions, in order to form the outer frame, it is necessary to provide a large die. Preparing of the die is quite expensive. When the outer frame is formed by use of the die, such various changes as the above cannot be made without changing greatly the manufacturing line. In addition, the outer frame which covers all the outer surfaces of the inner frame merely serves as a cover, and does not constitute any particular structure in combination with the inner frame. Therefore, only the inner frame supports the load imposed on the seat construction, and thus must be strong. Further, since it also must support the outer frame, the total weight of the seat construction is, of necessity, heavy.

The present invention is derived from the above-mentioned circumstances, and therefore, an object of the present invention is to provide a seat construction which can increase the degrees of freedom in changing the number of seats, changing the width of each seat, and changing the method of installing the seat construction into a mass transport vehicle, and which is light but rigid, and further has a good appearance.

The above-mentioned object of the invention can be achieved by a seat construction comprising a composite inner/outer frame and at least two seat pans each having bottom and back portions secured to a composite inner/outer frame including:

an inner frame front horizontal straight cross member located at a position corresponding to front ends of the bottom portions of the seat pans, an inner frame back top horizontal straight cross member located at a position corresponding to the top ends of the back portions of the seat pans, and formed independently from the inner frame horizontal cross member; and an inner frame intermediate horizontal straight cross member located at a position corresponding to the juncture of the bottom portion and the back portion of each seat pan and formed independently from the inner frame front and intermediate horizontal cross members;

a first boomerang shaped inner frame side member formed independently from the inner frame horizontal straight cross members, enjoined to one end of each of the inner frame cross members;

a second boomerang shaped inner frame side member formed independently from the inner frame cross members and the first boomerang shaped inner frame side member, joined to the opposite end of each of the cross members; an intermediate frame member formed independently from the cross members and the side members joined to the cross members at substantially mid-way between their opposite ends:

the outer frame having a pair of outer frame boomerang-shaped side members formed independently from each other and secured to the first and second inner boomerang shaped side members; to encase peripheries of the side members, a front outer frame cross member formed independently from the paired outer frame boomerang shaped side members, encasing a periphery of the inner frame front horizontal straight cross member, and secured at its opposite ends to front ends of the outer frame side members; and a top outer frame cross member formed independently from the paired outer frame boomerang-shaped side members and the front outer frame cross member, covering a periphery of the inner frame back top horizontal straight cross member and secured at its opposite ends to top ends of the outer frame side member; an intermediate outer frame brace member formed independently from the paired outer frame boomerang-shaped side members and the front and top outer frame cross members, covering a periphery of the intermediate inner frame member, and secured to the intermediate inner frame member, whereby the outer frame members cooperate to provide a unitary composite inner/outer frame for supporting a load applied to the seat construction.

In the seat construction constructed as described above in accordance with this invention, the width of the seat construction can be freely changed by simply changing the length of each of a plurality of inner frame horizontal cross members and the length of each of the outer frame front and top cross members, so as to correspond to the change of the number of seats, the change of the width of the seat and the change of the method of installing the seat construction into the mass transport vehicle. Further, these straight and independently formed cross members are formed by cutting standard linear structural members existing in the market to a desired length, and thus the seat construction of this invention can be manufactured at low cost. Further, the inner and outer frame members cooperate to provide unitary composite inner/outer frame for supporting a load applied to the seat construction. Therefore, the construction of the invention is light yet rigid, and the outer frame members do not mar the appearance of the seat construction.

In the seat construction as described above in accordance with this invention, by fixing metal fixtures and/or support legs to desired positions on the seat construction by use of a desired method, the seat construction can be installed in a mass transport vehicle so as to face front and sideways, and can be installed in a desired posture in public houses such as railway stations and outside.

In the seat construction constructed as described above in accordance with the invention, by fixing the respective interconnecting portions of the above-mentioned members to each other by welding, the weight of the construction for each interconnecting portion can be decreased and the strength thereof can be increased.

In the seat construction constructed as described above in accordance with this invention, by including horizontal back straps whose number corresponds to the number of seat pans in the inner frame, the strength of the inner frame for supporting the seat pans is increased.

In the seat construction constructed as described above in accordance with this invention, by forming the members of the outer frame with stainless steel, the appearance of the seat construction is improved, and is substantially free from regular maintenance.

In the seat construction constructed as described above in accordance with this invention, by forming each of two side members of the inner frame with a plurality of channel shape sections connected to one another by welding, the strength of the two side members is increased without highly increasing their weight.

In the seat construction constructed as described above in accordance with this invention, by providing back covers, the strength of the seat construction can be increased and the appearance of their rear portions of the seat construction is improved.

By providing a concave portion in the back cover, the cover is straightened against bending or torsion applied thereto. Each of the inner frame boomerang-shaped side members is formed of three welded sections, each of which is channel-shaped. Thus the center portions of the boomerang-shaped side members, which are easily stressed, can be formed of materials which differ in thickness or quality from those of which the side portions of the boomerang-shaped side members are formed. Further, only the center portions can be formed in a pattern-draw molding process, and used as both the center portions of the right side members and the center portions of the left side members. In other words, since the center portions of the right side members and the center portions of the left side members have the same form they can be formed at a relatively low cost. The side portions are formed by bending which is performed at low cost.

By forming the intermediate horizontal cross member of the present invention as a straight tube, the seat construction is light, and highly torsion-resistant.

Further, if the opposite ends of the straight tubular members are welded to the outer surfaces of the first and second boomerang-shaped inner frame members after they pass through the corresponding boomerang-shaped inner frame members, the welded portions therebetween which are concentrically stressed, can be light yet tough.

BRIEF DESCRIPTION OF THE DRAWINGS

The above features and objects of this invention will be apparent from the following detailed description of a presently preferred embodiment taken in conjunction with the accompanying drawings wherein like reference numerals refer to like parts in which:

FIG. 1 is a front perspective view of a two-passenger seat for a mass transport vehicle which embodies the present invention;

FIG. 2 is a rear perspective view of the seat shown in FIG. 1;

FIG. 3 is an exploded perspective view showing the frame structure of the seat shown in FIGS. 1 and 2 in partially assembled condition; and FIG. 4 is a fragmentary sectional view of the cantilever mounting arrangement for the seat of FIG. 1.

DETAILED DESCRIPTION OF THE PREFERRED EMBODIMENT

Referring to the drawings and with particular reference to FIGS. 1 and 2, a two-passenger seat embodying the present invention is generally depicted by the reference numeral 5 and comprises an outer frame 6A, bottom seat pans 7, back seat pans 8, and a grab rail 10. An inner frame 6B is shown in partially assembled condition in FIG. 3. The inner frame 6B comprises three cross tubes 11, 12 and 13 formed of tubular stock of equal lengths. In the illustrated embodiment, tubes 11 and 13 each have square cross-sectional configuration and are respectively located adjacent the front edge and back of the seat frame. Intermediate cross tube 12 has a circular cross-sectional configuration and is located at the intersection of the seat bottom and the seat back.

Inner frame 6B includes a boomerang-shaped inner frame side member 14 on the wall side of the seat 5 and a corresponding boomerang-shaped inner frame side member 15 on the aisle side of the seat. Midway between the boomerang inner frame side members 14 and 15, an intermediate inner frame member 16 is mounted on the cross tubes 11, 12 and 13.

The wall-side side member 14 is formed of three welded sections 17, 18 and 20 over which a boomerang-shaped outer frame side member 21 of the outer frame 6A is secured, preferably by welding. Likewise, the aisle-side side member 15 includes three welded inner frame sections 22, 23 and 24, and a boomerang-shaped outer frame side member 25 of the outer frame 6A. As shown, frame sections 22, 23 and 24 can be opposite handed with respect to sections 17, 18 and 20 and ell are channel shaped so as to provide opposing flanges which interfit within the outer frame side members 21 and 25, respectively, and permit spot welding at multiple locations such as generally indicated by reference numeral. 26. The outer frame side members 21, 25 are preferably formed of stainless steel and are secured in place after the interior sections 17, 18 and 20 of the inner frame side members 14 and 22, 23 and 24 of member 15 have been secured by welding to the adjacent ends of the cross tubes 11, 12 and 13. As shown in FIG. 3, the interior sections 17, 18, 20 and the outer frame side member 21 are located at the left end of the seat, and the interior sections 22, 23, 24 and the outer frame side member 25 are located at the right end of the seat.

Connections between the opposite ends of the cross tube 11 and the front ends of the side sections 17 and 22 can be strengthened by insertion of angle braces, one of which is shown for illustrative purposes and designated by the reference numeral 27. Likewise, the connections between the opposite ends of the top cross tube 13 and the upper ends of the inner side sections 20 and 24 can be strengthened by insertion of angle braces, one of which is being shown and designated by the reference numeral 28. It will be understood that the angle braces 27 and 28 are secured in place by welding and the cross tubes 11 and 13 are also secured thereto by welding.

The intermediate inner frame member 16 includes a bottom section 30 secured to the cross tubes 11 and 12 and a seat back section 31 secured to the cross tubes 12 and 13. Sections 30 and 31 of intermediate inner frame member 16 are channel shaped with laterally extending flanges to which an outer frame intermediate brace member 32, preferably formed with flat stock stainless steel, is spot welded.

The inner frame 6B can be reinforced by the provision of a pair of curved back straps 33 (only one of which is shown) which also provide means for attachment of the back seat pans 8. Each of the back straps 33 is secured at its outer end to one of the upper sections 20, 24 of the wall side and aisle-side side member 14, 15 respectively, and at its inner end to the adjacent sides of the back section 31 of the intermediate member 16.

To complete the outer frame 6A, a channel-shaped outer frame front cross piece 34, preferably formed of stainless steel, is secured at its opposite ends to the respective front ends of the outer side frame side members 21 and 25 by welding, and an outer frame top cross member 35, also preferably formed of stainless steel, is secured at its opposite ends to the upper cross tube 13 and/or outer frame side members 21–25. All of the exposed welds formed in the composite inner/outer frame 6A, 6B are ground and polished so as to provide smooth exterior surfaces as shown in FIGS. 1 and 2.

A pair of bottom seat pans 7 (only one of which is shown in FIG. 3) are removably secured on the inner frame front cross tube 11 and a pair of back seat pans 8 (only one of which is shown in FIG. 3) are removably secured to the back portion of inner frame 6B. Thus, a pair of brackets are welded to each half of the cross tube 11. These brackets 40 have apertures 41 in their rearwardly extending tabs for receiving self-drilling screws 42 inserted into apertures 43 from the underside of the front end of the bottom seat pan 7. A pair of brackets 44, upstanding portions thereof welded to the cross tube 12, are fastened at their apertured downwardly extending portions to the upturned rear edge of the bottom seat pan 7 by screws or other appropriate fasteners, so that each bottom seat pan 7 can be fixed to a desired location in the inner frame 6B.

Each back seat pan 8 is provided at its top with a pair of upper attachment brackets 45 and at its middle portions with a pair of lower attachment brackets 46 (only one of which is shown in FIG. 3). Each bracket 45 includes an attachment face which may be secured to the upper cross tube 13 while each bracket 46 has an offset portion that can be secured to the adjacent end of back strap 33. Self-drilling screws may be used to attach each back seat pan 8 to the apertured tab portions of the brackets 45 and 46.

The back of the seat 5 is enclosed by a stamped one-piece back cover indicated generally at 50. The back cover 50 is formed by a narrowed flat top portion 51, a middle recessed portion 52 and a curved bottom portion 53. If desired, the back cover 50 can be composed of separate sections which are welded together to form a one-piece member with suitable reinforcing strips. The cover 50 is welded to the composite inner/outer frame 6A/6B and, as such, provides additional strength to the seat 5.

If desired, the grab rail 10 can be secured at its opposite ends to a pair of apertures 60 (only one of which is shown in FIG. 3) in top cross tube 13. The aperture 60 are in registration with openings 61 formed in opposite ends of the outer frame top cross member 35. The lower ends of grab rail 10 are equipped with the grab rail plugs 62 which are inserted through the openings 61 and secured to the top cross tube 13 in a known manner.

As best shown in FIG. 4, each of the seats 5 is secured in cantilever fashion to a mounting bracket 63 having an upwardly extending flange 64 fixed to the inner surface 65 of an exterior wall and a downwardly extending flange 66 fixed to the inner surface 67a of an interior wall 67 of the vehicle. Three attachment bushings 80 extend through the wall-side boomerang-shaped side assembly 14 and the wall-side boomerang-shaped outer frame side member 21 and welded thereto. A bolt 68 is inserted from the inner frame side member 14 into a through hole of each bushing 80 and a nut 70 is threaded on a threaded end 69 of the bolt 68 to rigidly attach the seat 5 to the interior wall 65 of the vehicle. As also shown in FIG. 4, the bottom seat pan 7 includes a metal base 71 over which a foam cushion 72 and a cover (e.g. fabric) layer 73 may be provided.

It will be apparent to those skilled in this art that the present invention and various aspects thereof can be embodied in other forms of seat constructions and that modifications and variations thereof can be made without departing from the spirit and scope of this invention. Accordingly, this invention is to be construed and limited only by the scope of the appended claims.

What is claimed:

1. A seat construction comprising:

a composite inner/outer frame and at least two seat pans each having bottom and back portions and secured to the composite inner/outer frame, said composite inner/outer frame including an inner frame and an outer frame;

said inner frame having an inner frame front horizontal straight cross member located at a position corresponding to front ends of the bottom portions of the seat pans; an inner frame back top horizontal straight cross member located at a position corresponding to top ends of the back portions of the seat pans, and formed independently from said inner frame front horizontal straight cross member; an inner frame intermediate horizontal straight cross member located at a position corresponding to the juncture of the bottom portion and the back portion of each seat pan, and formed independently from said inner frame front and intermediate horizontal cross members, wherein said inner frame intermediate horizontal straight cross member is a straight tubular member; a first boomerang-shaped inner frame side member formed independently from said inner frame horizontal straight cross members, and joined to one end of each of said inner frame cross members; a second boomerang-shaped inner frame side member formed independently from said inner frame cross members and said first boomerang-shaped inner frame side member, and joined to the opposite end of each of said cross members; and an intermediate inner frame member formed independently from said cross members and said side members, and joined to said cross members at substantially mid-way between their opposite ends the opposite ends of said inner frame intermediate horizontal straight cross member passing through the corresponding first and second boomerang-shaped inner frame side members, and welded to outer side surfaces of the corresponding first and second boomerang-shaped inner frame side members;

said outer frame having a pair of outer frame boomerang-shaped side members formed independently from each other and secured to said first and second inner frame boomerang-shaped side members; to encase peripheries of said inner frame side members; a front outer frame cross member formed independently from said paired outer frame boomerang-shaped side members, encasing a periphery of said inner frame front horizontal straight cross member, and secured at its opposite ends to front ends of the outer frame side members; a top outer frame cross member formed independently from said paired outer frame boomerang-shaped side members and said front outer frame cross member, covering a periphery of said inner frame back top horizontal straight cross member, and secured at its opposite ends to top ends of the outer frame side members; and intermediate outer frame brace member formed independently from said paired outer frame boomerang-shaped side members and front and top outer frame cross members, covering a periphery of said intermediate inner frame member, and secured to said intermediate inner frame, whereby said inner frame and outer frame members cooperate to provide a unitary composite inner/outer frame for supporting a load applied to said seat construction.

2. The seat construction according to claim 1 wherein said inner and outer frame members are welded at their respective connection points.

3. The seat construction according to claim 1 wherein said front outer frame cross member is channel-shaped and is welded at its opposite ends to the adjacent ends of said outer frame boomerang-shaped side members and the welds are machined, whereby said outer frame side members have an integral appearance.

4. The seat construction according to claim 1, wherein said inner frame includes at least two rearwardly curved horizontal back straps, each of said back straps being secured at its one end to the corresponding one of said inner frame boomerang-shaped side member and at its opposite end to said intermediate inner frame member.

5. The seat construction according to claim 1, wherein said outer frame members are formed of stainless steel.

6. The seat construction according to claim 1, wherein each of said inner frame boomerang-shaped side members is formed of three welded sections, each of which is channel-shaped.

7. The seat construction according to claim 1, further comprising an outer frame back cover member secured to said composite inner/outer frame to cover the back of the seat construction.

8. The seat construction according to claim 7, wherein said outer frame back cover member is provided with a recess to reinforce said back cover member.

9. A seat construction comprising:

a composite inner/outer frame and at least two seat pans each having bottom and back portions and secured to the composite inner/outer frame, said composite inner/outer frame including an inner frame and an outer frame;

said inner frame having an inner frame front horizontal straight cross member located at a position corresponding to front ends of the bottom portions of the seat pans; an inner frame back top horizontal straight cross member located at a position corresponding to top ends of the back portions of the seat pans, and formed independently from said inner frame front horizontal straight cross member; an inner frame intermediate horizontal straight cross member located at a position corresponding to the juncture of the bottom portion and the back -portion of each seat pan, and formed independently from said inner frame front and intermediate horizontal cross members; a first boomerang-shaped inner frame side member formed independently from said inner frame horizontal straight cross members, and joined to one end of each of said inner frame cross members; a second boomerang-shaped inner frame side member formed independently from said inner frame cross members and said first boomerang-shaped inner frame side member, and joined to the opposite end of each of said cross members; and an intermediate inner frame member formed independently from said cross members and said side members, and joined to said cross members at substantially mid-way between their opposite ends, the opposite ends of the inner frame intermediate horizontal straight cross member passing through the corresponding first and second boomerang-shaped inner frame side members, said ends of said intermediate horizontal straight cross member affixed to outer side surfaces of the corresponding first and second boomerang-shaped inner frame side members;

said outer frame having a pair of outer frame boomerang-shaped side members formed independently from each other and secured to said first and second inner frame boomerang-shaped side members; to encase peripheries of said inner frame side members; a front outer frame cross member formed independently from said paired outer frame boomerang-shaped side members, encasing a periphery of said inner frame front horizontal straight cross member, and secured at its opposite ends to front ends of the outer frame side members; and a top outer frame cross member formed independently from said paired outer frame boomerang-shaped side members and said front outer frame cross member, covering a periphery of said inner frame back top horizontal straight cross member, and secured at its opposite ends to top ends of the outer frame side members; and intermediate outer frame brace member formed independently from said paired outer frame boomerang-shaped side members and front and top outer frame cross members, covering a periphery of said intermediate inner frame member, and secured to said intermediate inner frame member, whereby said inner frame and outer frame members cooperate to provide a unitary composite inner/outer frame for supporting a load applied to said seat construction.

10. The seat construction according to claim 9, wherein said inner frame intermediate horizontal straight cross member is a straight tubular member.

11. The seat construction according to claim 9 wherein said inner and outer frame members are welded at their respective connection points.

12. The seat construction according to claim 9 wherein said front frame cross member is channel-shaped and is welded at its opposite ends to the adjacent ends of said outer frame boomerang-shaped side members and the welds are machined, whereby said outer frame side members have an integral appearance.

13. The seat construction according to claim 9, wherein said inner frame includes at least two rearwardly curved horizontal back straps, each of said back straps being secured at its one end of said inner frame boomerang-shaped side members and at its opposite end to said intermediate inner frame member.

14. The seat construction according to claim 9, wherein each of said inner frame boomerang-shaped side members is formed of three welded sections, each of which is channel-shaped.

15. The seat construction according to claim 9, further comprising an outer frame back cover member secured to said composite inner/outer frame to cover the back of the seat construction.

16. The seat construction according to claim 15 wherein said outer frame back cover member is provided with a recess to reinforce said back cover member.

* * * * *